(12) United States Patent
Kung et al.

(10) Patent No.: US 7,426,716 B2
(45) Date of Patent: Sep. 16, 2008

(54) RECOVERY AND REPRESENTATION OF OBJECT INTERACTION IN AN OBJECT ORIENTED PROGRAM

(75) Inventors: David C. Kung, Arlington, TX (US); Manish Jodhani, Irving, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 622 days.

(21) Appl. No.: 10/617,592

(22) Filed: Jul. 11, 2003

(65) Prior Publication Data

US 2005/0010899 A1    Jan. 13, 2005

(51) Int. Cl.
G06F 9/44 (2006.01)
(52) U.S. Cl. .................. 717/123; 717/104; 717/131
(58) Field of Classification Search .................. 717/123
See application file for complete search history.

(56) References Cited

U.S. PATENT DOCUMENTS

| | | | | |
|---|---|---|---|---|
| 5,586,020 | A * | 12/1996 | Isozaki ...................... | 717/159 |
| 6,442,751 | B1 * | 8/2002 | Cocchi et al. ................ | 717/133 |
| 6,598,181 | B1 * | 7/2003 | Pennell ........................ | 714/38 |
| 6,807,548 | B1 * | 10/2004 | Kemper .................. | 707/103 R |
| 6,851,107 | B1 * | 2/2005 | Coad et al. .................. | 717/108 |
| 7,003,507 | B2 * | 2/2006 | Tip et al. ........................ | 707/2 |
| 2003/0083900 | A1 * | 5/2003 | Khriss et al. .................... | 705/1 |
| 2003/0188299 | A1 * | 10/2003 | Broughton et al. .......... | 717/141 |

OTHER PUBLICATIONS

"OMG Unified Modeling Language Specification Version 1.3," Mar. 2000, pp. 1-6, 339-351, available from <http://www.omg.org/docs/formal/00-03-01.pdf>.*
Kung, David et al., "Developing an Object-Oriented Software Testing and Maintenance Environment," ACM: Communications of the ACM, vol. 38, No. 10, Oct. 1995, pp. 75-87.*
Kung, C.H. et al., "Design Recovery for Software Testing of Object-Oriented Programs," IEEE: Proceedings of the Working Conference on Reverse Engineering, 1993, pp. 202-211.*
Biggerstaff, Ted J., "Design Recovery for Maintenance and Reuse," IEEE: Computer, vol. 22, No. 7, Jul. 1989, pp. 36-49.*
Manish Jodhani, *Reverse Engineering of Object Oriented Programs to Yield Sequence Diagrams*; Masters' Thesis; The University of Texas at Arlington; Aug. 2002; pp. 1-61.

* cited by examiner

*Primary Examiner*—Tuan Q. Dam
*Assistant Examiner*—Michael J Yigdall
(74) *Attorney, Agent, or Firm*—Chalker Flores, LLP; Edwin S. Flores; Daniel J. Chalker (57) ABSTRACT

A process and system are provided for representing object interactions, by means of a sequence diagram or the like, wherein the object interactions are recovered from source code written in Java or other object-oriented programming language. Initially, a Method Information Parser determines the respective methods declared inside the source code and extracts their names. A Method Detail Parser then extracts the method calls to other objects within a method, to resolve each complex method call into multiple lines of single method calls. Information derived from the multiple lines of single method calls is then used to generate the sequence diagram.

27 Claims, 3 Drawing Sheets

RECOVERY AND REPRESENTATION OF OBJECT INTERACTION IN AN OBJECT ORIENTED PROGRAM

TECHNICAL FIELD OF THE INVENTION

The Grant Program of the State of Texas may own certain rights in this invention pursuant to the terms of the Advanced Technology Program No. 003656-97 and Technology Development & Transfer Program No. 003656-92.

The invention is generally directed to a process and system for recovering information pertaining to object interactions in a previously developed object-oriented software program, and to providing a visual or other representation of the recovered object interactions. More particularly, the invention pertains to a reverse engineering approach for automatically recovering the object interaction information, and generating a corresponding sequence diagram or other useful representation thereof.

BACKGROUND OF THE INVENTION

Software testing tends to consume a substantial portion of total software development effort, and software maintenance can amount to up to 60% of life cycle costs. A common problem in both software testing and maintenance is deficient documentation, wherein the documentation is often non-existent, inadequate or outdated. These deficiencies can occur for a number of reasons, including inadequate analysis and design effort, requirements changes and changes to code, wherein corresponding updates to the design are not made. Design recovery from object-oriented (OO) programs such as JAVA™ by Sun Microsystems and C++ has been proposed, as a means to obtain design information when accurate documentation is not available. Previously, techniques have been proposed for reverse engineering JAVA™ and C++ programs to uncover static relationships among objects, such as inheritance, aggregation and association, member function control and data flow relationships, and object state dependent behavior. Reverse engineering is generally the process of analyzing a subject to identify system components and their relationships, and to create representations of a system in another form at a higher level of abstraction.

Object-Oriented Technologies Works (OOTWorks) is a tool that uses the reverse engineering approach to help analyze, test, and maintain object-oriented software. It contains three kinds of diagrams. They are Object Relation Diagram (ORD), Block Branch Diagram (BBD), and Object State Diagram (OSD). ORD is used to display class relationships, BBD is used to represent the structure of a member function within a class, and OSD is used to display the state dependent behaviors of objects.

Object Relation Diagram not only can represent the relations between classes, but also can generate automated test schedule, test order, and identify the ripple effect to save time and effort in regression testing.

BBD (Block Branch Diagram) is a reverse engineering tool that displays the control structure and the interfaces of a member function. Besides the structure of a member function, Block Branch Diagram also shows the independent basis paths in the method. It also helps identify the complexity of a method. Like ORD, it can generate the test case based on the basis paths it found.

The three tools of OOTWorks offer tests from different levels. ORD tests at class level. BBD tests at the class member function level. OSD tests at the class data member level based on the different states of the objects. The reverse-engineering tool, SDG, is added to become another integral part of the toolset.

Objects in an OO program interact with each other to accomplish a business task. The objects are instances of respective object classes, and the classes also have methods belonging to them. A method is a certain single operation that is invoked or called at run-time, in order to change the state or characteristic of an object in its associated class. The interactions among the objects may be quite complex, due to powerful OO features such as encapsulation, information hiding, polymorphism and inheritance. Encapsulation is modeling and storing, with an object, the attributes and methods or operations that the object is capable of performing. In information hiding, only the operations of a particular object can be used to access private components of the particular object. As a result of the above OO features, several member functions, or method calls, can be invoked to achieve an intended functionality, wherein the member functions or method calls may be from different object classes. In object-oriented programming, polymorphism is the characteristic of being able to assign a different meaning or usage to something in different contexts—specifically, to allow an entity such as a variable, a function, or an object to have more than one form All reversed engineering environment need tools for extracting the information to be analyzed. Static information includes software artifacts and their relations. In JAVA™, for example, such artifacts may be classes, interfaces, methods and variables. The relations might include extension relationships between classes or interfaces, and calls between methods. Dynamic information contains software artifacts as well, and in addition contains sequential event trace information, information about current behavior and code convergence. Static information can be extracted, for example, by using parser-based grammars. For extracting dynamic information, a debugger, profilers, or event recorders can be used.

Extracted information of the above type is not useful unless it can be shown in a readable and descriptive way. Accordingly, program comprehension, by building graphical or viewable design models from existing software, has been supported in many reverse engineering and design recovery tools and environments. There are generally three kinds of views that can be used to illustrate the extracted information, i.e., static, dynamic and merged views, respectively. A static view contains only static information and a dynamic view contains only dynamic information. A merged view is used to show both static and dynamic information in a single view. A merged view is useful, as it provides a connection between static and dynamic information. However, because of polymorphism and inheritance, a static analysis is not able to extract method information from method calls. On the other hand, building an abstraction for merged views can be difficult, since static and dynamic abstractions usually differ considerably.

SUMMARY OF THE INVENTION

In order to facilitate understanding, test generation, debugging and documentation, an embodiment of the invention has been developed to provide a reverse engineering technique for design recovery of object interactions from OO programs, such as JAVA™ or C++. Moreover, the embodiment is adapted to represent the artifacts of the program in a very useful form, such as in the form of sequence diagrams. The embodiment of the invention usefully comprises a static analysis technique, wherein multiple passes are used to break the complex OO code and uncover object interactions gradually during successive passes. This enables the embodiment of the invention to support certain powerful features of the OO paradigm, such as inheritance and polymorphism. That is, the proposed method can handle calls to member functions of super-classes as well as calls to polymorphic functions. In addition, the embodiment can handle consecutive calls in the form of O.f( ... ).g( ... ).h( ... ).k( ... ), where "O" represents an object reference, and "f," "g," "h" and "k" each represent methods, which is very common in JAVA™ programming. It is to be understood, however, that embodiments of the invention are not limited to either JAVA™ or to representation by means of sequence diagrams.

It is anticipated that embodiments of the invention will be particularly beneficial in software design modification and debugging, and in providing accurate documentation for software maintenance. In regard to design modification, designs usually have to be modified during the implementation phase to accommodate requirements changes. Debugging involves tracing code to identify discrepancies between implementation and expectations. Accurate and comprehensible documentation is crucial to the success of large-scale development.

One embodiment of the invention is directed to a process for providing a representation of object interactions or other specified characteristics of a previously developed object-oriented software program, the program including a number of object classes and further including object related methods belonging to respective classes. The process comprises the steps of sensing that at least one complex method call is included in the software program, a number of methods being associated with each complex method call, and extracting a number of single or individual method calls from each complex method call. The process further comprises the steps of generating a set of information for each of the methods from the single method calls, and constructing a representation of interactions between objects of the software program from the information contained in the method information sets.

Preferably, the extracting step of the above process comprises replacing a component of a complex method call with a phase variable, to produce a method call of reduced complexity. Preferably also, the process includes an initial step of extracting the names of the methods from the software program, and the class to which each method belongs.

In a preferred embodiment of the above process, the extracting step comprises a first parsing phase disposed to separate all casting operations, a second parsing phase disposed to isolate all method parameters, and a third parsing phase disposed to separate the complex method call into multiple lines, one for each single method call. The representation construction step comprises constructing a sequenced diagram depicting the interactions between respective objects of the software program.

DETAILED DESCRIPTION OF A PREFERRED EMBODIMENT

A very useful embodiment of the invention may be employed to recover, or uncover, object interaction features from the source code of a JAVA™ program, although other embodiments may be used in connection with C++ or other programming languages. Generally, respective methods are detected and parsed to gain insight into object interactions. The object interactions are then graphically depicted in the form of a sequence diagram, using a sequence diagram Generator (SDG) constructed in accordance with an embodiment of the invention. The sequence diagram preferably uses a Unified Modeling Language (UML), although other languages can alternatively be used.

A UML sequence diagram is preferred in representing the uncovered object interactions because UML is widely used in the software industry. A sequence diagram helps a user to document and understand the dynamic aspects of a software system through sequences of messages that are sent and received among objects. In particular, it shows the objects participating in the interaction by their "lifelines" and the messages they exchange are arranged in time sequence. A sequence diagram has four primary elements: objects, lifelines, messages and focus. Objects are represented by boxes and placed at the top of the sequence diagram across its horizontal axis. A lifeline, represented by a dotted line that extends down the vertical axis from the base of an object, indicates the existence of an object during a period of time. Messages represent the interactions among the objects. Messages are shown as labeled arrows from the lifeline of one object to the lifeline of another object. Focus of control shows a time period during which an object is performing an action in response to a message received. Focus of control is shown as a tall thin rectangle whose top is aligned with the action's initiation time and whose bottom is aligned with the action's completion time. The top of the focus of control rectangle coincides with the receipt of a message. The bottom of the rectangle coincides with the completion of an action. Focus of control rectangles can be stacked in layers on a sequence diagram to indicate focus of control nesting.

Figure 1:
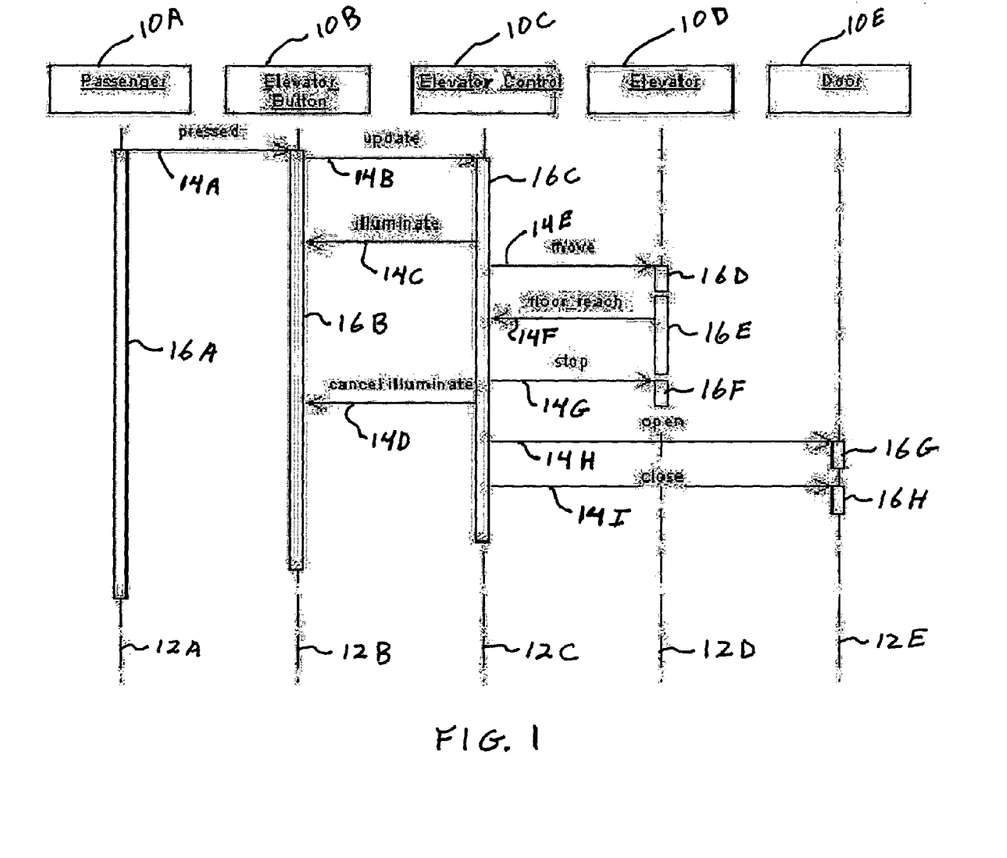
FIG. 1 shows a simplified sequence diagram for illustration purposes.

To further illustrate respective components of a sequence diagram, reference may be made to FIG. 1. FIG. 1 shows objects 10A-10E, respectively labeled "Passenger," "Elevator Button," "Elevator Control," "Elevator" and "Door." FIG. 1 further shows lifelines 12A-12E, associated with objects 10A-10E, respectively, and messages 14A-14I. The message arrows 14A-14I are respectively directed as shown, and are respectively labeled "pressed," "updated," "illuminate," "cancel illuminate," "move," "floor reach," "stop," "open" and "close." The focus of controls are referenced as 16A-16H.

Figure 2:
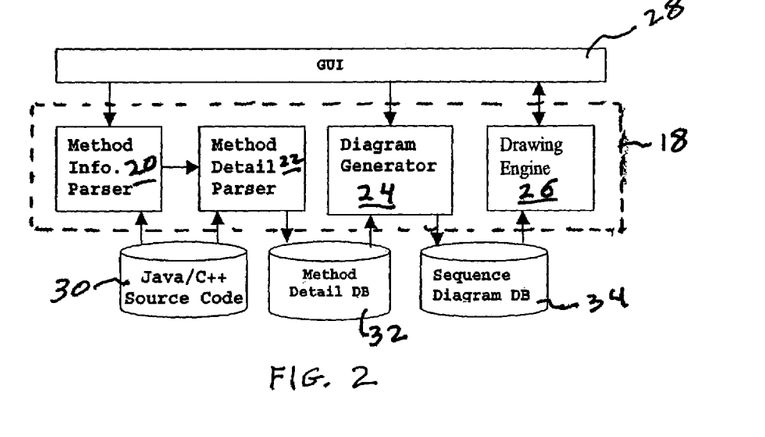
FIG. 2 is a block diagram showing respective components of an embodiment of the invention.

Referring to FIG. 2, there is shown SDG 18 comprising an embodiment of the invention. SDG 18 includes a Method Information Parser 20, a Method Detail Parser 22, a Diagram Generator 24 and a Drawing Engine 26. FIG. 2 further shows a Graphic User Interface (GUI) 28 connected to interact with Method Information Parser 20, Diagram Generator 24 and Drawing Engine 26, and JAVA™ (or C++) Source Code 30 is accessed by both Information Parser 20 and Detail Parser 22. The output of Method Information Parser 20 is provided as the input to Method Detail Parser 22, and the output thereof is placed in Method Detail Data Base, or repository, 32. Diagram Generator 24 is coupled to Data Base 32 and to Sequence Diagram Data Base 34, and Drawing Engine 26 is likewise coupled to Data Base 34.

In summarizing operation of SDG 18, Method Information Parser 20 extracts the method name and the beginning line number of a method selected by the user, by means of GUI 28. After extracting this information, method calls made by the selected method are captured and recorded in data repository 32. Since it is possible to combine several method calls into one complex single-line method call in OO programming, e.g., object. O.f( . . . ).g( . . . ).h( . . . ).k( . . . ), Method Detail Parser 22 is designed and implemented to extract the single or individual method calls from the complex single-line method call statement, as described hereinafter in further detail. The Diagram Generator 24 recursively invokes Method Information Parser 20 and Method Detail Parser 22 to extract method name, to capture methods being called from the current method, and to generate the corresponding sequence diagram entry in an ASCII file contained in Data Base 34. The Drawing Engine 26 reads the ASCII file and draws the sequence diagram. An entry for the sequence diagram is a quadruple, in which the components are separated by vertical bars "|," as follows:

<callingobject>:
        |<callingclass>|<callingmethodsignature>|<calleeobject>:<
    calleeclass>|[<conditional>][<var>:=]
        <calleemethodname><parameterlist>[:<returntype>]

The Sequence Diagram Generator 24 follows the depth first search strategy. That is, the recursive search is stopped when the Sequence Diagram Generator 18 encounters a JAVA™ Application Programming Interface (API) in the source code. In the embodiment, JAVA™ APIs are treated as black-boxes and not expanded. After all method calls are processed, the entries for the sequence diagram are passed to the Drawing Engine 26 to draw the sequence diagram.

The purpose of Method Information Parser 20 is to extract basic information about the methods of the classes from the source code. In the operation of Parser 20, the methods declared inside the source code are determined. Parser 20 then parses the source code and when it reaches a method declaration, the name of the method being declared is provided, as well as the class this method belongs to and its starting line number. The starting line number is required because this information is used to quickly locate the method in the operation of Method Detail Parser 32 to parse the method. The class name and method name tell which method and which class it belongs to will be parsed. The captured information regarding the method is stored in the following format:

FileName|MethodName|StartingLineNumber

This information is eventually written to an ASCII file so that other tools can easily read and process it. In order to ensure that the ASCII file corresponding to a particular class is not overwritten, a hierarchy of directory structure is used to organize the ASCII files, as follows:

.\dat\PackageName\ClassName\filename.dat

Method Operation Parser 20 can also extract information regarding all the packages or classes that are imported in the JAVA™ file being parsed, and this information is likewise stored in the data repository 32 in an ASCII file. This information can be helpful in later stages of parsing, if it is necessary to determine the return type of a method.

Method Detail Parser 22 extracts the method calls to other objects within a method. It produces the following information, represented in the following format:

ClassName|MethodName|NumberOfParameters|ParameterList|ReturnType|Absolute Path|Condition ClassName: the name of the class that this method belongs to.

MethodName: the name of this method.
    NumberOfParameters: the number of parameters.

ParameterList: the list of all parameters for this method.

Condition: the condition that must be evaluated to true for the method to be invoked.

ReturnType: gives information about the return type of the method.

AbsolutePath: absolute path of the source file containing the method

To maintain this information for a particular method, the following directory structure, similar to the structure for Method Information Parser 20, is used:

.\dat\PackageName\ClassName\MethodName\function.dat

Method Detail Parser 22 overcomes several technical difficulties, including a difficulty caused by the common practice of OO programming of making consecutive function calls using a single statement of the form object O.f ( . . . ) g( . . . ) h( ) . . . . For the purpose of sequence diagram generation, it is necessary to determine the classes associated with the objects making the function calls. Thus, in the above example, it is necessary to obtain the class for object, that is the class for the object resulting from the call to object O.f ( . . . ) . . . Another difficulty overcome by Detail Parser 22 is associated with the casting operation, which changes the type or class of an object. The casting operation can appear anywhere, including consecutive method calls in a single statement. This poses some difficulty in the static analysis of programs. A further challenge overcome is the handling of complex actual parameters that are passed to a method during a call. For example, an actual parameter may itself be a consecutive function call in a single phrase like object O.f (x.g( . . . )h( . . . ) . . . ). Finally, Parser 22 is able to differentiate and properly process both application defined functions and JAVA™ APIs.

Figure 3:
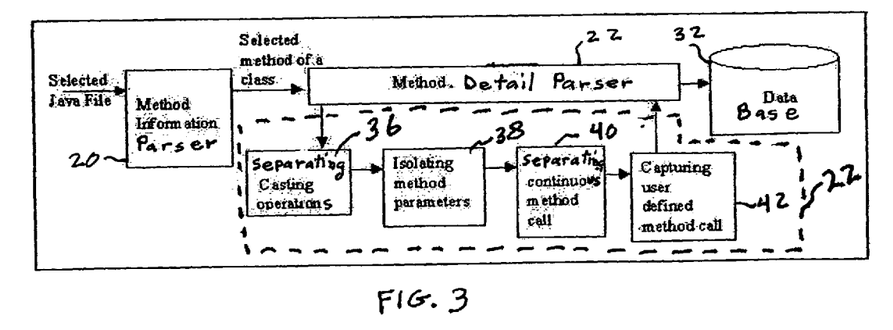
FIG. 3 is a block diagram showing the Method Detail Parser of FIG. 2 in greater detail.

Method Detail Parser 22 achieves its results by breaking the complex parsing process into a series of simple parsing phases as follows:

(1) Separating casting operations
    (2) Isolating method parameters
    (3) Separating continuous method calls
    (4) Capturing user defined method calls Referring to FIG. 3, there is shown Method Detail Parser 22 comprising the above phases or components 36-42, respectively. The phases are each described hereinafter.

Separating Casting Operations

Casting changes the type of an object or the return type of a method call. Since the casted type must be determined before any operation on an object of the casted type can be executed, the casting operation needs to be taken care of in the first step. This phase separates all the casting operations in a method call. Accordingly, phase variables are used to replace the casting expression. The idea of this phase can be easily conveyed by a dummy example:

x=(Metrics)m[i].getInstance( ); // is converted to
    SDG P1 654321 0=m[i].getInstance( );
    x=(Metrics) SDG_P1__654321__0;
    where SDG_P1__654321__0 is a phase variable.

Isolating Method Parameters

Next, it is necessary to take care of complex arguments in method calls. Complex arguments, such as a function call to an object, must be isolated and replaced with simple arguments. This is necessary if the type of an argument cannot be found from the declarations of variables. For example, the argument is a function call. Phase variables are again introduced to represent the arguments that are isolated. This is done in order to get the return type of the function call. The argument type is needed to resolve polymorphism. This is illustrated using a simple example:
   getString(FanOut( ),b); // is converted to
   SDG_P2__654321__0=FanOut( );
   getString(SDG_P2__654321__0,b);
   where SDG_P2__654321__0 is a phase variable.

Separating Single Statement Continuous Method Calls

This phase breaks single statement continuous method calls into multiple lines of simple method calls. For example:
   x=c.getInstance( ).get( ); // is converted to
   SDG_P3__654321__0=c.getInstance( );
   x=SDG_P3__654321__0.get( ); and
   where SDG_P3__654321__0 is a phase variable.

Combining Phases (1)-(3)

Consider a complex method call that looks like:
   x=c.getInstance((Metrics)getString(new FanOut( ),b)).get( );
   After separating the casting operations results in:
   SDG_P1__654321__0=getString (FanOut( ), b);
   SDG_P1__654321__1=(Metrics) SDG_P1__654321__0;
   x=(c.getInstance (SDG_P1__654321__1).get ( ));
   Isolating method parameters produces:
   SDG_P2__654321__0=FanOut( );
   SDG_P1__654321__0=getString(SDG_P2__654321__0, b);
   SDG_P1__654321__1=(Metrics) SDG_P1__654321__0;
   x=(c.getInstance(SDG_P1__654321__1).get( ));
   Separating continuous method calls yields:
   SDG_P2__654321__0=FanOut( );
   SDG_P1__654321__0=getString(SDG_P2__654321__0, b);
   SDG_P1__654321__1=(Metrics) SDG_P1__654321__0;
   SDG_P3__654321__0=c.getInstance(SDG_P1__654321__1);
   x=SDG_P3__654321__0.get( );

Capturing User Defined Method Calls

This is the main phase, which finds out the types for all variables and method calls. In this phase, the output provided by the Separating Continuous Method Calls phase is parsed to find the correct variable types (including the phase variables). If a standard JAVA™ API is called, then reflection and the imports file generated by Method Information Parser 20 is used to get the return type.

Parsing Issues

Since JAVA™ is a new programming language and still evolving, it is inefficient to keep a large record for all standard JAVA™ methods (API's) and use it to distinguish between them and user-defined methods. To distinguish between standard JAVA™ APIs and user-defined methods, a preferred approach is to use the symbol table created by ORD. This table contains all the user-defined classes and file locations for the classes. To determine if a method is a user defined method, the class name of the object containing this method is first retrieved. This class name is then compared with all the class names in the symbol table (this comparison includes package name and class name). If this class name is recorded in the symbol table, then it is a user-defined method; otherwise, it is a standard Java JAVA™.

Reference was previously made to inheritance, one of the powerful features of modern object-oriented programming language. Inheritance implies that methods defined for a superclass are automatically defined for its subclasses. That is, a call to a method of an object of a subclass may in fact invoke a method defined in the superclass. The Method Detail Parser 22 utilizes the inheritance relationships captured by ORD. When encountering a method call, it first tracks the inheritance path until it reaches a parent class in which the method is defined. If no such class is found, then the parser uses the import clauses and reflection to trace the JAVA™ APIs, to identify the class that defines the method. Another powerful feature in OO programming is polymorphism. Polymorphism allows programmers to write multiple methods with the same name but different parameter types or number of parameters. In the approach of the invention, polymorphism is solved by using reflection and a symbol table generated by ORD. The symbol table entry contains the following information:
   PackageName\ClassName\MethodName\ParameterList\NumberofParameters\ReturnType\Starting-LineNumber\

Reflection is used to retrieve class-related information such as class attributes and methods. Since a method can be either a standard JAVA™ API or a user-defined method, it is necessary to match the correct method separately. If it is decided that the method call is a standard JAVA™ API, reflection is used to get the return type of the standard JAVA™ API. The type is then used to update the variable table in case it is used as one of the parameters in another method call. On the other hand, if this method call is a user-defined method call, the data in the ORD symbol table is searched for the user-defined method to match with the correct version of the method call. As in retrieving the return type in standard JAVA™ API, the return object type is updated in the variable table as well.

A sequence diagram displays the condition of a method call to indicate that the call occurs only when the condition is evaluated to true. Nested if-then-else statements require that the Parser 22 must generate correct conditions for drawing the sequence diagram. Accordingly, a condition stack and recursion to handling nested if-then-else statements is used as follows:

(1) When an "if" statement is encountered, the condition is pushed onto the condition stack.

(2) Parsing the statement is continued following the true part of the if statement, which may be a compound statement consisting of a block of statements.

(3) When a method call is encountered, the conjunction of the conditions from the condition stack is used as the guard condition of the method call.

(4) When an "else" token is encountered, each of the conditions on the condition stack is negated. The conditions are restored when the end of the "else" part is encountered.

(5) At the end of an "if" statement, the corresponding condition is obtained from the condition stack.

Switch and iterative statements are handled similarly.

Figure 4:
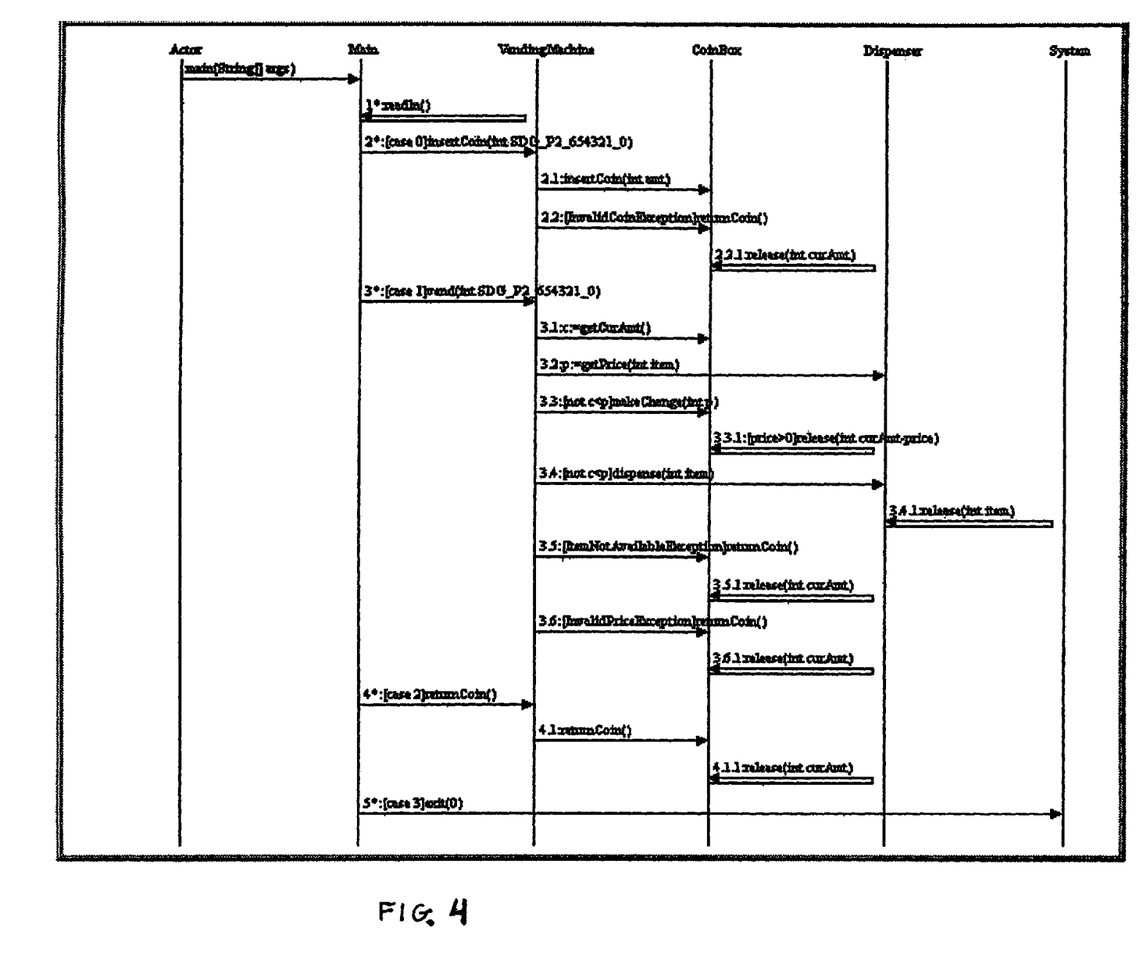
FIG. 4 shows a sequence diagram generated in accordance with an embodiment of the invention.

Referring to FIG. 4, there is shown a sequence diagram generated in accordance with an embodiment of the invention, from software code listed hereinafter under the headings "Main Program," "Vending Machine," "Coin Box" and "Item Dispenser." In the sequence diagram of FIG. 4, a sequence number notation is used to signify the order of the messages, and thus simplify the drawing effort. For example, a message with a sequence number 2.2.1 implies that it is a call from the message with a sequence number 2.2 which in turn is called from a message with a sequence number 2. FIG. 4 also shows the use of phase variables, such as SDG_P2__654321__0 shown in connection with sequence numbers 2 and 3 of FIG. 4, to recursively simplify complex method calls as described above. Obviously, many other modifications and variations of the present invention are possible in light of the above teachings. The specific embodiments discussed here are merely illustrative and are not meant to limit the scope of the present invention in any manner. It should be appreciated that the present invention provides many applicable inventive concepts that may be embodied in a wide variety of specific contexts. It is therefore to be understood that within the scope of the disclosed concept, the invention may be practiced otherwise than as specifically described.

Main Program

```
package coinbox;
import java.io.*;
import Math.*;
public class Main
{
private static BufferedReader br =
new BufferedReader (new InputStreamReader(System.in));
private static int readln( )
{
String selection = "";
try {
selection = br.readLine( );
} catch (IOException e)
{
e.printStackTrace( );
}
return Integer.parseInt(selection);
}
public static void main(String[] args)
{
VendingMachine vm = new VendingMachine( );
int selection = 0;
while (true)
{
switch (readln( ))
{
case 0: vm.insertCoin(25);
break;
case 1: System.out.print("select item 0-4: ");
vm.vend(readln( ));
break;
case 2: vm.returnCoin( );
break;
case 3: System.exit(0);
break;
default: ;
}
}
}
}
```

Vending Machine

```
package coinbox;
import java.io.*;
public class VendingMachine
{
private CoinBox coinBox = new CoinBox( );
private Dispenser dispenser = new Dispenser( );
public void insertCoin(int amt)
{ try {
coinBox.insertCoin(amt);
} catch (InvalidCoinException e)
{ coinBox.returnCoin( );
e.printStackTrace( );
}
}
public void vend(int item)
{
int c = coinBox.getCurAmt( );
try {
int p = dispenser.getPrice(item);
if (c<p)
System.out.println ("inadequate payment");
else
{
```

```
coinBox.makeChange(p);
dispenser.dispense(item);
}
} catch (UnknownItemException uie)
{ uie.printStackTrace( );
} catch (ItemNotAvailableException inae)
{ inae.printStackTrace( );
coinBox.returnCoin( );
} catch (InvalidPriceException ipe)
{ ipe.printStackTrace( );
coinBox.returnCoin( );
}
}
public void returnCoin( ) { coinBox.returnCoin( ); }
}
```

Coin Box

```
package coinbox;
import java.io.*;
public class CoinBox
{
private int curAmt;
private int total;
public int getCurAmt ( ) { return curAmt; }
public void insertCoin (int amt)
throws InvalidCoinException
{ if(amt!=5&&amt!=10&&amt!=25)
throw new InvalidCoinException( );
this.curAmt += amt;
System.out.println ("Current Amount is "+curAmt);
}
public int getTotal ( ) { return total; }
public void makeChange (int price)
throws InvalidPriceException
{ if (price>0)
{ release(curAmt-price);
curAmt = 0;
total += price;
}
else
throw new InvalidPriceException( );
}
private void release (int amt)
{ System.out.println ("Release "+amt); }
public void returnCoin ( )
{ release (curAmt); curAmt=0; }
}
```

Item Dispenser

```
package coinbox;
import java.io.*;
public class Dispenser
{
private int[] prices = new int[] {50, 50, 50, 50, 50};
private int[] qoh = new int[] {100, 100, 100, 100, 100};
public int getPrice (int item)
throws UnknownItemException
{
if(item<0 || item > prices.length)
throw new UnknownItemException( );
return prices[item];
}
public void dispense (int item)
throws ItemNotAvailableException
{
if (qoh[item]==0)
throw new ItemNotAvailableException( );
release (item);
```

-continued

```
    qoh[item]--;
    }
    private void release (int item)
    {
    System.out.println ("Call dispenser driver to release item "+item);
    }
    }
```

What is claimed is:

1. A process for providing a run-time representation of specified characteristics of a previously developed object-oriented software program, the software program including a plurality of object classes and further including object related methods belonging to respective object classes, the process comprising:

sensing at least one complex method call by examining the source code of the software program, a plurality of the methods being associated with each of the at least one complex method call, wherein the at least one complex method call includes at least one single method call;

extracting the at least one single method call from each of the at least one complex method call, wherein the extracting comprises recursively replacing the at least one single method call with a phase variable;

parsing the phase variable to resolve any polymorphic behavior associated with the extracted at least one single method call;

generating a set of information for each of the methods from the at least one single method call, the information set for a particular method containing at least a name of the particular method and the run-time object class of the plurality of object classes to which the particular method belongs, wherein at least one of the object related methods in the software program is a polymorphic method and the run-time object class is determined based on the parsing of the phase variable; and constructing a representation of interactions between objects of the software program from the information contained in the method information sets.

2. The process of claim 1, wherein the at least one single method call comprises a method parameter of the at least one complex method call or a continuous method call.

3. The process of claim 1, wherein the process further comprises extracting the name and class of each of the methods from the software program.

4. The process of claim 1, wherein the extracting comprises output a given complex method call as multiple lines, wherein at least one of the multiple lines contains the at least one single method call.

5. The process of claim 4, wherein the extracting comprises:

a first parsing phase configured to separate any casting operations included in the given complex method call;

a second parsing phase configured to isolate any method parameters included in the given complex method call; and a third parsing phase configured to resolve any continuous method calls included in the given complex method call into multiple lines, each containing one of the at least one single method call.

6. The process of claim 5, wherein the first parsing phase is implemented prior to the second parsing phase, and the second parsing phase is implemented prior to the third parsing phase.

7. The process of claim 6, wherein the generating includes parsing an output provided by the third parsing phase to determine the correct object class for each of the methods.

8. The process of claim 7, wherein the process further comprises determining whether a method is a user-defined method or a standard application programming interface method.

9. The process of claim 1, wherein the constructing comprises constructing a sequence diagram depicting the interactions between respective objects of the software program.

10. The process of claim 9, wherein the sequence diagram displays a condition of a method call to indicate that the method call occurs only when the condition is evaluated to be true.

11. The process of claim 1, wherein the software program is in the form of source code.

12. The process of claim 1, wherein the software program is written in JAVA™ software code.

13. The process of claim 1, wherein the software program is written in C++ software code.

14. The process of claim 1, wherein at least one of the object related methods in the software program is related to an inheritance feature, and the extraction includes tracking an inheritance path until it reaches a parent object class to which the method is defined.

15. A computer program product in a computer readable media for providing a run-time representation of specified characteristics of a previously developed object-oriented software program, the software program including a plurality of object classes and object related single methods belonging to respective object classes, the software program further including at least one complex method call containing a plurality of the single methods, the computer program product comprising:

first instructions for extracting a plurality of individual method calls from each of the at least one complex method call by examining the source code of the software program, wherein the first instructions comprise recursively replacing each of the single methods with a phase variable;

second instructions for parsing the phase variable to resolve any polymorphic behavior associated with the extracted plurality of individual method calls;

third instructions for storing in a data base a set of information for each of the single methods, the set of information for a particular single method containing at least a name of the particular method and the run-time object class of the plurality of object classes to which the particular method belongs, wherein at least one of the object related single methods in the software program is a polymorphic method and the run-time object class is determined based on the parsing of the phase variable; and fourth instructions for graphically constructing and graphically outputting a representation of interactions between objects of the software program from the information contained in the set of information.

16. The computer program product of claim 15, wherein further comprising fifth instructions for extracting the name and the object class of each of the single methods from the software program.

17. The computer program product of claim 16, wherein the first instructions comprise sixth instructions for outputting a given complex method callas multiple lines, each containing one of the single method calls.

18. The computer program product of claim 17, wherein the first instructions sequentially implement a first parsing phase to separate any casting operations included in the given complex method call, a second parsing phase to isolate any method parameters included in the given complex method call, and a third parsing phase to resolve the given complex method call into multiple lines, each containing one of the single method calls.

19. The computer program product of claim 18, wherein the third instructions constructs a sequence diagram depicting the interactions between respective objects of the software program.

20. The computer program product of claim 19, wherein the software program is in the form of source code.

21. An apparatus for providing a sequence diagram representing specified run-time characteristics of a previously developed object-oriented software program, the software program including a plurality of object classes and further including object related methods belonging to respective object classes, the apparatus comprising:
   a computer system having a display;
   means for sensing at least one complex method call by examining the source code of the software program, a plurality of the methods being associated with each of the at least one complex method call;
   Method Detail Parser means for extracting a plurality of single method calls from each of the at least one complex method call, the Method Detail Parser means comprises recursively replacing the associated methods with a phase variable;
   means for parsing the phase variable to resolve any polymorphic behavior associated with the extracted plurality of single method calls;
   means for generating a set of information for each of the object related methods from the single method calls, the set of information for a particular object related method containing at least a name of the particular method and the run-time object class of the plurality of object classes to which the particular method belongs, wherein at least one of the object related methods in the software program is a polymorphic method and the run-time object class is determined based on the parsing of the phase variable; and
   means for constructing a sequence diagram representing interactions between objects of the software program from the information contained in the sets of information and outputting the sequence diagram on the display.

22. The apparatus of claim 21, wherein the apparatus further comprises Method Information Parser means for extracting the name and the object class of each of the methods from the software program.

23. The apparatus of claim 22, wherein the Method Detail Parser means is operable to output a given complex method callas multiple lines, each containing one of the single method calls.

24. The apparatus of claim 23, wherein the Method Detail Parser means is configured to separate any casting operations included in the given complex method call during a first parsing phase, to isolate any method parameters included therein during a second parsing phase, and resolve the given complex method call into multiple lines, each containing one of the single method calls, during a third parsing phase.

25. The apparatus of claim 24, wherein the first parsing phase is implemented prior to the second parsing phase, and the second parsing phase is implemented prior to the third parsing phase.

26. The apparatus of claim 25, wherein the constructing means comprises a drawing engine for depicting interactions between respective objects of the software program.

27. The apparatus of claim 26, wherein the software program is in the form of source code.

* * * * *

UNITED STATES PATENT AND TRADEMARK OFFICE
CERTIFICATE OF CORRECTION

PATENT NO. : 7,426,716 B2
APPLICATION NO. : 10/617592
DATED : September 16, 2008
INVENTOR(S) : David C. Kung and Manish Jodhani It is certified that error appears in the above-identified patent and that said Letters Patent is hereby corrected as shown below:

Col. 1, line 30
Replace "requirements" with --requirement--

Col. 3, line 19
Replace "requirements" with --requirement--

Col. 6, line 2
Replace "evaluated to true" with --evaluated to be true--

Col. 7, line 22
Replace "SDG_P1_654321_1" with --SDG P1 654321 1--

Col. 7, line 60
Replace "Java JAVA$^{TM}$" with --JAVA$^{TM}$ API--

Col. 12, line 64
Replace "callas" with --call as--

Col. 14, line 17
Replace "callas" with --call as--

Signed and Sealed this

Twenty-fourth Day of February, 2009

JOHN DOLL
*Acting Director of the United States Patent and Trademark Office*